US012480050B2

(12) United States Patent
Hayashi et al.

(10) Patent No.: US 12,480,050 B2
(45) Date of Patent: *Nov. 25, 2025

(54) CHOLESTERIC LIQUID CRYSTAL FILM

(71) Applicant: FUJIFILM Corporation, Tokyo (JP)

(72) Inventors: Takahiro Hayashi, Kanagawa (JP); Satoshi Kuniyasu, Kanagawa (JP); Mitsuyoshi Ichihashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 78 days.

This patent is subject to a terminal disclaimer.

(21) Appl. No.: 17/858,561

(22) Filed: Jul. 6, 2022

(65) Prior Publication Data

US 2022/0333013 A1    Oct. 20, 2022

Related U.S. Application Data

(63) Continuation of application No. PCT/JP2020/043477, filed on Nov. 20, 2020.

(30) Foreign Application Priority Data

Jan. 28, 2020   (JP) .................... 2020-011540

(51) Int. Cl.
*G02F 1/1333* (2006.01)
*C08J 5/18* (2006.01)
*C09K 19/36* (2006.01)
*C09K 19/56* (2006.01)

(52) U.S. Cl.
CPC ............... *C09K 19/36* (2013.01); *C08J 5/18* (2013.01); *C09K 19/56* (2013.01)

(58) Field of Classification Search
CPC .... G02F 1/13; G02F 1/1333; G02F 1/133543; G02F 1/137; G02F 1/13718; C09K 19/38; C09K 2019/0444
See application file for complete search history.

(56) References Cited

U.S. PATENT DOCUMENTS

| | | | |
|---|---|---|---|
| 6,410,130 B1 | 6/2002 | Schuhmacher et al. | |
| 6,537,624 B1 | 3/2003 | Suzuki et al. | |
| 6,605,235 B1 | 8/2003 | Meyer et al. | |
| 6,627,270 B1 | 9/2003 | Nishimura | |
| 10,459,132 B2 | 10/2019 | Yamamoto et al. | |
| 11,209,688 B2 | 12/2021 | Katoh et al. | |
| 11,732,194 B2 | 8/2023 | Kodama et al. | |
| 11,828,960 B2 * | 11/2023 | Sasata ................ | G02B 5/1861 |
| 11,919,327 B2 * | 3/2024 | Kaneiwa ............. | B32B 7/06 |
| 11,977,306 B2 * | 5/2024 | Hayashi ............. | G02F 1/13718 |
| 2002/0045676 A1 | 4/2002 | Coates et al. | |
| 2002/0159019 A1 | 10/2002 | Pokorny et al. | |
| 2003/0086044 A1 | 5/2003 | Inoue et al. | |
| 2003/0090618 A1 | 5/2003 | Kashima | |
| 2006/0152656 A1 | 7/2006 | Kashima et al. | |
| 2007/0258024 A1 | 11/2007 | Parri et al. | |
| 2010/0182545 A1 | 7/2010 | Kashima et al. | |
| 2017/0227692 A1 | 8/2017 | Nagai et al. | |
| 2017/0343830 A1 | 11/2017 | Nagai et al. | |
| 2018/0164480 A1 | 6/2018 | Yoshida | |
| 2019/0033634 A1 | 1/2019 | Katoh et al. | |
| 2019/0196245 A1 | 6/2019 | Ichihara et al. | |
| 2019/0391479 A1 | 12/2019 | Katoh et al. | |
| 2020/0183214 A1 | 6/2020 | Katoh | |
| 2020/0409202 A1 | 12/2020 | Kodama et al. | |
| 2021/0026049 A1 | 1/2021 | Saitoh et al. | |
| 2021/0116615 A1 | 4/2021 | Kodama et al. | |
| 2021/0208316 A1 | 7/2021 | Sato et al. | |
| 2022/0333013 A1 * | 10/2022 | Hayashi ............. | C09K 19/36 |
| 2022/0372372 A1 * | 11/2022 | Hayashi ............. | C09K 19/586 |
| 2022/0373726 A1 * | 11/2022 | Hayashi ............. | G02B 5/1833 |

FOREIGN PATENT DOCUMENTS

| | | | |
|---|---|---|---|
| CN | 1527956 | A | 9/2004 |
| CN | 1573458 | A | 2/2005 |
| CN | 1823284 | A | 8/2006 |
| CN | 107111029 | A | 8/2017 |
| CN | 107250910 | A | 10/2017 |
| CN | 108885293 | A | 11/2018 |
| CN | 109716181 | A | 5/2019 |

(Continued)

OTHER PUBLICATIONS

Chinese Office Action and Search Report for corresponding Chinese Application No. 202080091366.8, dated Jul. 12, 2023, with a partial English translation.
Japanese Decision of Refusal for Japanese Application No. 2021-574539, dated Oct. 24, 2023, with an English translation.
Japanese Notice of Reasons for Refusal for Japanese Application No. 2021-574540, dated Oct. 24, 2023, with an English translation.
Chinese Office Action and Search Report for Chinese Application No. 202080095000.8, dated Sep. 16, 2023, with an English translation.
Chinese Office Action and Search Report for Chinese Application No. 202080095223.4, dated Aug. 5, 2023, with a partial English translation.
International Preliminary Report on Patentability and Written Opinion of the International Searching Authority (Forms PCT/IB/326, PCT/IB/373, and PCT/ISA/237) for International Application No. PCT/JP2020/047688, dated Aug. 11, 2022, with an English translation.

(Continued)

*Primary Examiner* — Geraldina Visconti
(74) *Attorney, Agent, or Firm* — Birch, Stewart, Kolasch & Birch, LLP

(57) ABSTRACT

The present disclosure provides a cholesteric liquid crystal film including a first cholesteric liquid crystal layer having a stripe pattern in which dark portions and bright portions, which are observed with a microscope, are alternately arranged and a second cholesteric liquid crystal layer which is disposed in contact with the first cholesteric liquid crystal layer and has a stripe pattern in which dark portions and bright portions, which are observed with a microscope, are alternately arranged, in which, at an interface between the first cholesteric liquid crystal layer and the second cholesteric liquid crystal layer, the dark portions observed in the second cholesteric liquid crystal layer is connected to the dark portions observed in the first cholesteric liquid crystal layer.

11 Claims, 1 Drawing Sheet

(56) References Cited

FOREIGN PATENT DOCUMENTS

| | | |
|---|---|---|
| EP | 1 045 260 A1 | 10/2000 |
| JP | 2000-95883 A | 4/2000 |
| JP | 2001-172329 A | 6/2001 |
| JP | 2001-515094 A | 9/2001 |
| JP | 2002-189124 A | 7/2002 |
| JP | 2005-37735 A | 2/2005 |
| JP | 2005-49866 A | 2/2005 |
| JP | 2007-94625 A | 4/2007 |
| JP | 2008-505369 A | 2/2008 |
| JP | 2013-120350 A | 6/2013 |
| JP | 2013-233733 A | 11/2013 |
| JP | 2018-180122 A | 11/2018 |
| KR | 10-2019-0026916 A | 3/2019 |
| WO | WO 99/34242 A1 | 7/1999 |
| WO | WO 2016/194961 A1 | 12/2016 |
| WO | WO 2017/221806 A1 | 12/2017 |
| WO | WO 2018/043678 A1 | 3/2018 |
| WO | WO 2018/159751 A1 | 9/2018 |
| WO | WO 2019/035449 A1 | 2/2019 |
| WO | WO 2019/181247 A1 | 9/2019 |
| WO | WO 2019/182052 A1 | 9/2019 |
| WO | WO 2019/187951 A1 | 10/2019 |
| WO | WO 2019/189586 A1 | 10/2019 |
| WO | WO 2020/066429 A1 | 4/2020 |
| WO | WO 2020/196659 A1 | 10/2020 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/047689, dated Aug. 11, 2022, with an English translation.
International Search Report (Form PCT/ISA/210) for International Application No. PCT/JP2020/047688, dated Feb. 16, 2021, with an English translation.
International Search Report (Form PCT/ISA/210) for International Application No. PCT/JP2020/047689, dated Feb. 16, 2021, with an English translation.
Japanese Notice of Reasons for Refusal for Japanese Application No. 2021-574539, dated May 30, 2023, with an English translation.
Japanese Notice of Reasons for Refusal for Japanese Application No. 2021-574540, dated May 30, 2023, with an English translation.
U.S. Office Action for U.S. Appl. No. 17/874,489, dated Jul. 27, 2023.
U.S. Office Action for U.S. Appl. No. 17/876,315, dated Dec. 8, 2023.
International Preliminary Report on Patentability and Written Opinion of the International Searching Authority (Forms PCT/IB/326, PCT/IB/373, and PCT/ISA/237) for International Application No. PCT/JP2020/043477, dated Aug. 11, 2022, with an English translation.
International Search Report (Form PCT/ISA/210) for International Application No. PCT/JP2020/043477, dated Feb. 9, 2021, with an English translation.
Japanese Notice of Reasons for Refusal for corresponding Japanese Application No. 2021-574482; dated Feb. 14, 2023, with an English translation.
Japanese Office Action for Japanese Application No. 2021-574540, dated Mar. 26, 2024, with an English translation.
U.S. Office Action for U.S. Appl. No. 17/874,489, dated May 22, 2024.
Japanese Office Action for Japanese Application No. 2021-574539, dated Apr. 2, 2024, with an English translation.
Chinese Office Action for Chinese Application No. 202080095223.4, dated Jan. 25, 2024, with an English translation.
U.S. Office Action for U.S. Appl. No. 17/874,489, dated Feb. 14, 2024.
U.S. Office Action for U.S. Appl. No. 17/876,315, dated Mar. 22, 2024.
Chinese Office Action and Search Report for Chinese Application No. 202080095000.8, dated Jun. 8, 2024, with a partial English translation.
Korean Office Action for Korean Application No. 10-2022-7025941, dated Jun. 25, 2024, with an English translation.
U.S. Office Action for U.S. Appl. No. 17/876,315, dated Sep. 28, 2024.
U.S. Office Action for U.S. Appl. No. 17/874,489, dated Jan. 15, 2025.
Korean Office Action for corresponding Korean Application No. 10-2022-7021871, dated Jun. 19, 2024, with an English translation.
South Korean Office Action for South Korean Application No. 10-2022-7026360, dated Oct. 7, 2024, with an English translation.
Japanese Office Action for Japanese Application No. 2021-574540, dated Jul. 23, 2024, with an English translation.
Korean Office Action for Korean Application No. 10-2022-7026360, dated May 16, 2025, with English translation.
U.S. Office Action for U.S. Appl. No. 17/874,489, dated Aug. 1, 2025.
U.S. Office Action for U.S. Appl. No. 17/876,315, dated Jul. 2, 2025.
U.S. Office Action for U.S. Appl. No. 17/876,315, dated Jan. 6, 2025.

* cited by examiner

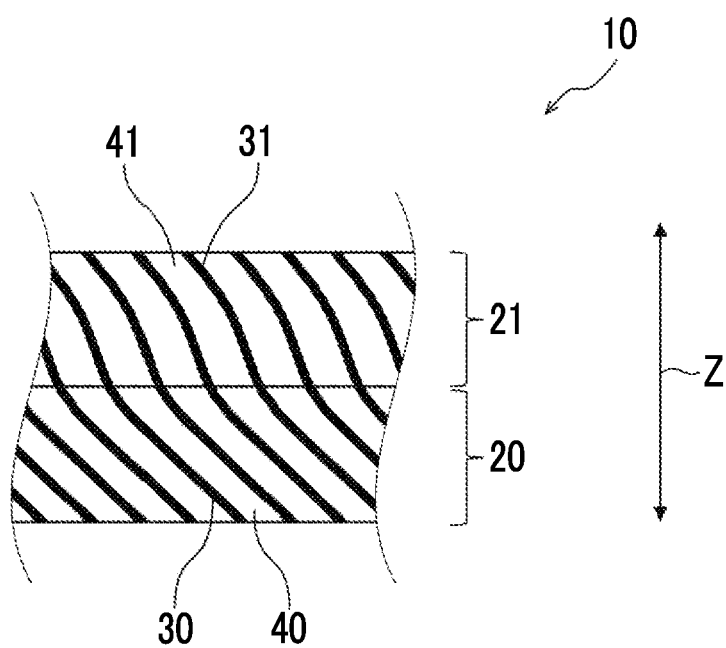

CHOLESTERIC LIQUID CRYSTAL FILM

CROSS-REFERENCE TO RELATED APPLICATIONS

This application is a continuation application of International Application No. PCT/JP2020/043477, filed Nov. 20, 2020, the disclosure of which is incorporated herein by reference in its entirety. Further, this application claims priority from Japanese Patent Application No. 2020-011540, filed Jan. 28, 2020, the disclosure of which is incorporated herein by reference in its entirety.

BACKGROUND OF THE INVENTION

1. Field of the Invention

The present disclosure relates to a cholesteric liquid crystal film.

2. Description of the Related Art

A cholesteric liquid crystal layer is known as a layer having properties of selectively reflecting either dextrorotatory circularly polarized light or levorotatory circularly polarized light in a specific wavelength range, for example.

The cholesteric liquid crystal layer developed for various applications is used, for example, as a projected image display member (for example, a reflecting element). Recently, attempts have been made to impart reflection anisotropy to the cholesteric liquid crystal layer (for example, see JP2005-37735A).

SUMMARY OF THE INVENTION

Depending on the application of the cholesteric liquid crystal layer, a plurality of cholesteric liquid crystal layers may be combined. Since a wavelength of light reflected by the cholesteric liquid crystal layer depends on a helical pitch (also referred to as a length of a helical axis per rotation of a helix; the same applies hereinafter), for example, by using a plurality of cholesteric liquid crystal layers having different helical pitches, it is possible to widen a wavelength range of light which can be reflected.

In the use of a plurality of cholesteric liquid crystal layers, from the viewpoint of manufacturing cost, it is preferable to stack the plurality of cholesteric liquid crystal layers and bring the cholesteric liquid crystal layers into direct contact with each other. However, in the stacking a plurality of cholesteric liquid crystal layers as described above, in a case where an orientation of molecular axes of the liquid crystal layers is disturbed at a laminated interface, there is a problem that a haze of the obtained cholesteric liquid crystal film is large.

The present disclosure has been made in view of the above-described circumstances.

One aspect of the present disclosure is to provide a cholesteric liquid crystal film with a small haze.

The present disclosure includes the following aspects.
<1> A cholesteric liquid crystal film comprising:
  a first cholesteric liquid crystal layer having a stripe pattern in which dark portions and bright portions, which are observed with a microscope, are alternately arranged; and
  a second cholesteric liquid crystal layer which is disposed in contact with the first cholesteric liquid crystal layer and has a stripe pattern in which dark portions and bright portions, which are observed with a microscope, are alternately arranged,
  in which, at an interface between the first cholesteric liquid crystal layer and the second cholesteric liquid crystal layer, the dark portions observed in the second cholesteric liquid crystal layer is connected to the dark portions observed in the first cholesteric liquid crystal layer.
<2> The cholesteric liquid crystal film according to <1>,
  in which, in a cross-sectional view in a thickness direction, a distance between two adjacent dark portions in the dark portions observed in the second cholesteric liquid crystal layer is different from a distance between two adjacent dark portions in the dark portions observed in the first cholesteric liquid crystal layer.
<3> The cholesteric liquid crystal film according to <1> or <2>,
  in which, in a cross-sectional view in a thickness direction, a distance between two adjacent dark portions in the dark portions observed in the second cholesteric liquid crystal layer is larger than a distance between two adjacent dark portions in the dark portions observed in the first cholesteric liquid crystal layer.
<4> The cholesteric liquid crystal film according to <1>,
  in which, in a cross-sectional view in a thickness direction, a ratio of a distance between two adjacent dark portions in the dark portions observed in the second cholesteric liquid crystal layer to a distance between two adjacent dark portions in the dark portions observed in the first cholesteric liquid crystal layer is 1 to 2.
<5> The cholesteric liquid crystal film according to any one of <1> to <4>,
  in which, in a cross-sectional view in a thickness direction, a distance between two adjacent dark portions in the dark portions observed in the first cholesteric liquid crystal layer is 0.1 μm to 2 μm.
<6> The cholesteric liquid crystal film according to any one of <1> to <5>,
  in which, in a cross-sectional view in a thickness direction, a distance between two adjacent dark portions in the dark portions observed in the second cholesteric liquid crystal layer is 0.1 μm to 5 μm.
<7> The cholesteric liquid crystal film according to any one of <1> to <6>,
  in which, at the interface between the first cholesteric liquid crystal layer and the second cholesteric liquid crystal layer, a proportion of the dark portions observed in the second cholesteric liquid crystal layer, which is connected to the dark portions observed in the first cholesteric liquid crystal layer, is 50% to 100% with respect to the number of dark portions observed in the second cholesteric liquid crystal layer.
<8> The cholesteric liquid crystal film according to any one of <1> to <7>,
  in which, in a cross-sectional view in a thickness direction, the dark portions observed in the first cholesteric liquid crystal layer is inclined with respect to a main surface of the first cholesteric liquid crystal layer, and the dark portions observed in the second cholesteric liquid crystal layer is inclined with respect to a main surface of the second cholesteric liquid crystal layer.
<9> The cholesteric liquid crystal film according to any one of <1> to <8>,
  in which, in a cross-sectional view in a thickness direction, an average angle of the dark portions observed in the first cholesteric liquid crystal layer is 20° to 90° with respect to a main surface of the first cholesteric liquid crystal layer.

<10> The cholesteric liquid crystal film according to any one of <1> to <9>, in which, in a cross-sectional view in a thickness direction, an average angle of the dark portions observed in the second cholesteric liquid crystal layer is 30° to 90° with respect to a main surface of the second cholesteric liquid crystal layer.

<11> The cholesteric liquid crystal film according to any one of <1> to <10>, wherein the stripe pattern of the first cholesteric liquid crystal layer is observed at least in a cross section of the first cholesteric liquid crystal layer in a thickness direction, and the stripe pattern of the second cholesteric liquid crystal layer is observed at least in a cross section of the second cholesteric liquid crystal layer in a thickness direction.

According to one aspect of the present disclosure, a cholesteric liquid crystal film having a small haze is provided.

BRIEF DESCRIPTION OF THE DRAWINGS

FIG. 1 is a schematic cross-sectional view showing an example of a cholesteric liquid crystal film according to an embodiment of the present disclosure.

DESCRIPTION OF THE PREFERRED EMBODIMENTS

Hereinafter, embodiments of the present disclosure will be described in detail. The present disclosure is not limited in any way to the following embodiments, and may be implemented with appropriate modifications within the scope of the purpose of the present disclosure. A dimensional ratio in the drawing does not necessarily represent the actual dimensional ratio.

The numerical range indicated by using "to" in the present disclosure indicates a range including numerical values described before and after "to" as a lower limit value and an upper limit value, respectively. Regarding numerical ranges which are described stepwise in the present disclosure, an upper limit value or a lower limit value described in a numerical value may be replaced with an upper limit value or a lower limit value of another stepwise numerical range. In addition, regarding a numerical range described in the present disclosure, an upper limit value or a lower limit value described in a numerical value may be replaced with a value described in Examples.

In the present disclosure, the amount of each component in a composition means, in a case where the composition contains a plurality of substances corresponding to such a component, the total amount of the plurality of substances in the composition, unless otherwise specified.

In the present disclosure, a term "step" not only includes an independent step, but also includes a step, in a case where the step may not be distinguished from the other step, as long as the expected object of the step is achieved.

In the present disclosure, "% by mass" and "% by weight" are synonymous, and "parts by mass" and "parts by weight" are synonymous.

In the present disclosure, a combination of two or more preferred aspects is a more preferred aspect.

In the present disclosure, ordinal numerals (for example, "first" and "second") are terms used to distinguish a plurality of constituent elements, and do not limit the number of constituent elements and the superiority or inferiority of the constituent elements.

In the present disclosure, a "cross section in a thickness direction" means a surface which appears by cutting an object along the thickness direction.

In the present disclosure, a term "main surface of a liquid crystal layer" used with regard to a cross-sectional view in the thickness direction is used to refer to, in the cross-sectional view in the thickness direction, at least one of two surfaces (that is, upper surface and bottom surface) of the liquid crystal layer which intersect the thickness direction.

In the present disclosure, a "molecular axis" means an axis which passes through a center of a molecular structure along a longitudinal direction of the molecular structure. However, a "molecular axis" used for a disk-like liquid crystal compound means an axis which intersects a disc plane of the disk-like liquid crystal compound at a right angle.

In the present disclosure, a "solid content" means components obtained by excluding a solvent from all components of an object.

In the present disclosure, a "mass of solid content" means a mass obtained by subtracting a mass of the solvent from a mass of the object.

<Cholesteric Liquid Crystal Film>

A cholesteric liquid crystal film according to an embodiment of the present disclosure includes a first cholesteric liquid crystal layer having a stripe pattern in which dark portions and bright portions, which are observed with a microscope, are alternately arranged and a second cholesteric liquid crystal layer which is disposed in contact with the first cholesteric liquid crystal layer and has a stripe pattern in which dark portions and bright portions, which are observed with a microscope, are alternately arranged, in which, at an interface between the first cholesteric liquid crystal layer and the second cholesteric liquid crystal layer, the dark portions observed in the second cholesteric liquid crystal layer is connected to the dark portions observed in the first cholesteric liquid crystal layer. According to one aspect of the present disclosure described above, a cholesteric liquid crystal film having a small haze is provided.

The reason why the cholesteric liquid crystal film according to the embodiment of the present disclosure exerts the above-described effect is presumed as follows. In a case where a plurality of cholesteric liquid crystal layers are stacked, an alignment of liquid crystals (for example, an alignment of liquid crystal compounds) may be disturbed due to an intramolecular interaction at an interface between two adjacent cholesteric liquid crystal layers. It is considered that, in a case where the alignment of liquid crystals is disturbed, a change in refractive index is large locally, so that light is scattered and the haze is large. On the other hand, with the cholesteric liquid crystal film according to the embodiment of the present disclosure, since, at the interface between the first cholesteric liquid crystal layer and the second cholesteric liquid crystal layer, the dark portions observed in the second cholesteric liquid crystal layer is connected to the dark portions observed in the first cholesteric liquid crystal layer, even in a case where a plurality of cholesteric liquid crystal layers are stacked, a disorder of the alignment of liquid crystals can be suppressed. Therefore, the haze of the cholesteric liquid crystal film according to the embodiment of the present disclosure is reduced.

In the following description, the first cholesteric liquid crystal layer may be referred to as a "first liquid crystal layer", and the second cholesteric liquid crystal layer may be referred to as a "second liquid crystal layer". In the following description, in a case where it is not necessary to clearly distinguish the first cholesteric liquid crystal layer and the second cholesteric liquid crystal layer, the first cholesteric liquid crystal layer and the second cholesteric liquid crystal layer may be collectively referred to as a "liquid crystal layer".

[First Cholesteric Liquid Crystal Layer]

The cholesteric liquid crystal film according to the embodiment of the present disclosure includes a first cholesteric liquid crystal layer having a stripe pattern in which dark portions and bright portions, which are observed with a microscope, are alternately arranged.

(Stripe Pattern)

A cholesteric liquid crystal, known as a form of liquid crystal, has a helical structure formed by helically arranging a plurality of liquid crystal compounds. An orientation of molecular axes of the liquid crystal compounds in the helical structure changes along a helical axis. Therefore, in a case where the cholesteric liquid crystal is observed with a microscope, dark portions (referred to a region which looks relatively dark; the same applies hereinafter) and bright portions (referred to a region which looks relatively bright; the same applies hereinafter) are observed depending on the orientation of the molecular axes of the liquid crystal compounds with respect to an observation direction. In the present disclosure, a scanning electron microscope or a polarization microscope is used as the microscope for observing the dark portions and the bright portions, unless otherwise specified.

The stripe pattern of the first liquid crystal layer may be observed on a surface of the above-described first liquid crystal layer (for example, a surface of the first liquid crystal layer opposite to a surface in contact with the second liquid crystal layer). The stripe pattern of the first liquid crystal layer may be observed in a cross section of the above-described first liquid crystal layer. It is preferable that the stripe pattern of the first liquid crystal layer is observed at least in the cross section of the first liquid crystal layer in the thickness direction. In the present disclosure, a sample used for cross-section observation may be produced by using, for example, a microtome.

It is preferable that, in the cross-sectional view in the thickness direction, the dark portions observed in the first liquid crystal layer is inclined with respect to a main surface of the above-described first liquid crystal layer. In the present disclosure, an aspect that "the dark portions are inclined with respect to a main surface of the liquid crystal layer" is not limited to a state in which the dark portions are inclined with respect to the main surface of the liquid crystal layer, and includes a state in which the dark portions are orthogonal to the main surface of the liquid crystal layer (that is, an angle formed by the dark portions and the main surface of the liquid crystal layer is 90°). For example, in a case where the stripe pattern is observed in the cross section of the first liquid crystal layer in the thickness direction, since the dark portions observed in the first liquid crystal layer is inclined, the helical axis which is substantially orthogonal to an arrangement direction of the bright portions and the dark portions are also inclined. Therefore, in a case where an angle between a direction of light incident on the first liquid crystal layer from an oblique direction (that is, an incident direction) and the helical axis is small, a circular polarization degree of light reflected by a reflecting surface (referred to a surface which is orthogonal to the helical axis and has the same orientation of molecular axes of the liquid crystal compounds existing on the same plane; the same applies hereinafter) derived from the cholesteric liquid crystal is increased.

In the cross-sectional view in the thickness direction, the fact that the dark portions observed in the first liquid crystal layer is inclined with respect to the main surface of the above-described first liquid crystal layer (hereinafter, in this paragraph, referred to as an "inclination of the dark portions") may be observed in at least one cross-sectional view of the liquid crystal layer in the thickness direction. For example, even in a case where the inclination of the dark portions are not observed in any one cross-sectional view, the inclination of the dark portions may be observed in the other cross-sectional view.

An angle of the dark portions observed in the first liquid crystal layer is not limited. In the cross-sectional view in the thickness direction, from the viewpoint of uniformity of an inclined angle of the helical axis, an average angle of the dark portions observed in the first liquid crystal layer is preferably 5° or more, more preferably 10° or more, and particularly preferably 20° or more with respect to the main surface of the above-described first liquid crystal layer. In the cross-sectional view in the thickness direction, the average angle of the dark portions observed in the first liquid crystal layer is preferably 90° or less with respect to the main surface of the above-described first liquid crystal layer.

In the cross-sectional view in the thickness direction, the average angle of the dark portions observed in the first liquid crystal layer is measured by the following method. Based on a cross-sectional image of the first liquid crystal layer in the thickness direction, which is obtained with a scanning electron microscope or a polarization microscope, an angle (hereinafter, also referred to as an "inclined angle") formed by a straight line (virtual line) passing through both ends in the longitudinal direction of one randomly selected dark portions and the main surface of the first liquid crystal layer is measured. Unless the inclined angle is 90°, an angle (that is, an acute angle) smaller than a right angle is adopted as the inclined angle. The inclined angle is measured for a total of 5 dark portions. A value obtained by arithmetically averaging the measured values is defined as the average angle of the dark portions observed in the first liquid crystal layer.

A distance between dark portions observed in the first liquid crystal layer is not limited. In the cross-sectional view in the thickness direction, a distance between two adjacent dark portions in the dark portions observed in the first liquid crystal layer is preferably 0.01 µm or more, more preferably 0.05 µm or more, and particularly preferably 0.1 µm or more. In the cross-sectional view in the thickness direction, the distance between two adjacent dark portions in the dark portions observed in the first liquid crystal layer is preferably 500 µm or less, more preferably 100 µm or less, still more preferably 10 µm or less, and particularly preferably 2 µm or less. In a case where a helical pitch increases, the distance between two adjacent dark portions tends to increase. On the other hand, in a case where a helical pitch decreases, the distance between two adjacent dark portions tends to decrease. Hereinafter, the distance between two adjacent dark portions may be referred to as a "distance between dark portions".

In the cross-sectional view in the thickness direction, the distance between two adjacent dark portions in the dark portions observed in the first liquid crystal layer is measured by the following method. Based on a cross-sectional image of the first liquid crystal layer in the thickness direction, which is obtained with a scanning electron microscope or a polarization microscope, five sets of adjacent two dark portions composed of a total of six dark portions are selected, and the shortest distance between the two adjacent dark portions are measured in each of the five sets. More specifically, as the shortest distance between the two adjacent dark portions in the first set, the shortest distance between a center of one dark portions in a width direction and a center of another dark portions adjacent to the dark portions in the width direction is measured. Next, while changing the combination of the two dark portions to be measured each time, the shortest distance between the two adjacent dark portions from the second set to the fifth set is measured according to the above-described method. An arithmetic mean of the measured values is defined as the distance between two adjacent dark portions in the dark portions observed in the first liquid crystal layer.

It is preferable that liquid crystal compounds observed on the surface of the first liquid crystal layer opposite to the surface in contact with the second liquid crystal layer are arranged while being twisted along one direction of in-plane directions of the above-described first liquid crystal layer. By arranging the liquid crystal compounds as described above, since a linearity of the dark portions and the bright portions observed in the cross section in the thickness direction is high, the haze of the cholesteric liquid crystal film can be smaller.

In the present disclosure, the fact that "the liquid crystal compounds are arranged while being twisted along one direction of in-plane directions of the liquid crystal layer" means that, in a case where the surface (limited to a surface to be observed) of the liquid crystal layer is observed (that is, is viewed in a plane) with a scanning electron microscope or a polarization microscope, the stripe pattern in which the bright portions and the dark portions are alternately arranged is observed along one direction of the in-plane directions of the liquid crystal layer. Since the liquid crystal compounds are arranged while being twisted along one direction of the in-plane directions of the liquid crystal layer, the orientation of molecular axes of the liquid crystal compounds changes as it proceeds in the above-described one direction. Therefore, the stripe pattern in which the bright portions and the dark portions are alternately arranged is observed.

(Thickness)

A thickness of the first liquid crystal layer is not limited. From the viewpoint of suppressing an influence of smoothness of a surface shape of a layer adjacent to the first liquid crystal layer (for example, a substrate and the second liquid crystal layer), an average thickness of the first liquid crystal layer is preferably 0.1 µm or more, more preferably 0.5 µm or more, and particularly preferably 1 µm or more. From the viewpoint of transparency, the average thickness of the first liquid crystal layer is preferably 500 µm or less, more preferably 100 µm or less, and particularly preferably 20 µm or less.

The average thickness of the first liquid crystal layer is measured by the following method. Based on a cross-sectional image of the first liquid crystal layer in the thickness direction, which is obtained with a scanning electron microscope or a polarization microscope, thicknesses at 5 points are measured. A value obtained by arithmetically averaging the measured values is defined as the average thickness of the first liquid crystal layer.

(Composition)

Composition of the first liquid crystal layer is not limited as long as the stripe pattern in which the dark portions and the bright portions are alternately arranged is observed. Hereinafter, components of the first liquid crystal layer will be specifically described.

—Liquid Crystal Compound—

The first liquid crystal layer preferably includes a liquid crystal compound. The type of the liquid crystal compound is not limited. As the liquid crystal compound, for example, a known liquid crystal compound which forms a cholesteric liquid crystal can be used.

The liquid crystal compound may have a polymerizable group. The liquid crystal compound may have one kind alone or two or more kinds of the polymerizable groups. The liquid crystal compound may have two or more polymerizable groups of the same type. In a case where the liquid crystal compound has a polymerizable group, the liquid crystal compound can be polymerized. By polymerizing the liquid crystal compound, stability of the cholesteric liquid crystal can be improved.

Examples of the polymerizable group include a group having an ethylenically unsaturated double bond, a cyclic ether group, and a nitrogen-containing heterocyclic group capable of causing a ring-opening reaction.

Examples of the group having an ethylenically unsaturated double bond include an acryloyl group, a methacryloyl group, an acryloyloxy group, a methacryloyloxy group, a vinyl group, a vinylphenyl group, and an allyl group.

Examples of the cyclic ether group include an epoxy group and an oxetanyl group.

Examples of the nitrogen-containing heterocyclic group capable of causing a ring-opening reaction include an aziridinyl group.

The polymerizable group is preferably at least one selected from the group consisting of a group having an ethylenically unsaturated double bond and a cyclic ether group. Specifically, the polymerizable group is preferably at least one selected from the group consisting of an acryloyl group, a methacryloyl group, an acryloyloxy group, a methacryloyloxy group, a vinyl group, a vinylphenyl group, an allyl group, an epoxy group, an oxetanyl group, and an aziridinyl group, more preferably at least one selected from the group consisting of an acryloyl group, a methacryloyl group, an acryloyloxy group, and a methacryloyloxy group, and particularly preferably at least one selected from the group consisting of an acryloyloxy group and a methacryloyloxy group.

The liquid crystal compound is classified into, for example, a rod-like liquid crystal compound and a disk-like liquid crystal compound according to a chemical structure. The rod-like liquid crystal compound is known as a liquid crystal compound having a rod-like chemical structure. As the rod-like liquid crystal compound, for example, a known rod-like liquid crystal compound can be used. The disk-like liquid crystal compound is known as a liquid crystal compound having a disk-like chemical structure. As the disk-like liquid crystal compound, for example, a known disk-like liquid crystal compound can be used.

From the viewpoint of manufacturing cost, the liquid crystal compound is preferably a rod-like liquid crystal compound, and more preferably a rod-like thermotropic liquid crystal compound.

The rod-like thermotropic liquid crystal compound is a compound which has a rod-like chemical structure and exhibits liquid crystallinity in a specific temperature range. As the rod-like thermotropic liquid crystal compound, for example, a known rod-like thermotropic liquid crystal compound can be used.

Examples of the rod-like thermotropic liquid crystal compound include compounds described in "Makromol. Chem., vol. 190, p. 2255 (1989)", "Advanced Materials, vol. 5, p. 107 (1993)", U.S. Pat. Nos. 4,683,327A, 5,622,648A, 5,770, 107A, WO1995/22586A, WO1995/24455A, WO1997/00600A, WO1998/23580A, WO1998/52905A, JP1989-272551A (JP-H1-272551A), JP1994-16616A (JP-H6-16616A), JP1995-110469A (JP-H7-110469A), JP1999-513019B (JP-H11-513019B), JP1999-80081A (JP-H11-80081A), JP2001-328973A, and JP2007-279688A. Examples of the rod-like thermotropic liquid crystal compound also include the liquid crystal compound represented by General Formula 1 in JP2016-81035A and the compound represented by General Formula (I) or General Formula (II) in JP2007-279688A.

The rod-like thermotropic liquid crystal compound is preferably a compound represented by General Formula (1).

$$Q^1\text{-}L^1\text{-}A^1\text{-}L^3\text{-}M\text{-}L^4\text{-}A^2\text{-}L^2\text{-}Q^2 \quad (1)$$

In General Formula (1), $Q^1$ and $Q^2$ each independently represent a polymerizable group, $L^1$, $L^2$, $L^3$, and $L^4$ each independently represent a single bond or a divalent linking group, $A^1$ and $A^2$ each independently represent a divalent hydrocarbon group having 2 to 20 carbon atoms, and M represents a mesogen group.

Examples of the polymerizable group represented $Q^1$ and $Q^2$ in General Formula (1) include the above-described polymerizable group. Preferred aspects of the polymerizable group represented by $Q^1$ and $Q^2$ are the same as the preferred aspects of the polymerizable group described above.

As the divalent linking group represented by $L^1$, $L^2$, $L^3$, and $L^4$ in General Formula (1), a divalent linking group selected from the group consisting of —O—, —S—, —CO—, —NR—, —CO—O—, —O—CO—O—, —CO—NR—, —NR—CO—, —O—CO—, —O—CO—NR—, —NR—CO—O—, and NR—CO—NR— is preferable. R in the above-described divalent linking group represents an alkyl group having 1 to 7 carbon atoms or a hydrogen atom.

In General Formula (1), at least one of $L^3$ or $L^4$ is preferably —O—CO—O—.

In General Formula (1), $Q^1$-$L^1$- and $Q^2$-$L^2$- are each independently preferably $CH_2$=CH—CO—O—, $CH_2$=C($CH_3$)—CO—O—, or $CH_2$=C(Cl)—CO—O—, and more preferably $CH_2$=CH—CO—O—.

The divalent hydrocarbon group having 2 to 20 carbon atoms, represented by $A^1$ and $A^2$ in General Formula (1), is preferably an alkylene group having 2 to 12 carbon atoms, an alkenylene group having 2 to 12 carbon atoms, or an alkynylene group having 2 to 12 carbon atoms, and more preferably an alkylene group having 2 to 12 carbon atoms.

The divalent hydrocarbon group is preferably in a form of a chain. The divalent hydrocarbon group may include oxygen atoms which are not adjacent to each other or sulfur atoms which are not adjacent to each other. The divalent hydrocarbon group may have a substituent. Examples of the substituent include a halogen atom (for example, fluorine, chlorine, and bromine), a cyano group, a methyl group, and an ethyl group.

The mesogen group represented by M in General Formula (1) is a group which forms a main skeleton of the liquid crystal compound and contributes to the formation of the liquid crystal. With regard to the mesogen group represented by M, the description of "FlussigeKristalle in Tabellen II" (VEB Deutscher Verlag fur Grundstoff Industrie, Leipzig, 1984) (particularly, pp. 7 to 16) and the description of "Liquid Crystal Handbook" (edited by Liquid Crystals Handbook Editing Committee, Maruzen, 2000) (particularly, section 3) can be referred to.

Examples of a specific structure of the mesogen group represented by M in General Formula (1) include the structure described in paragraph [0086] of JP2007-279688A.

The mesogen group represented by M in General Formula (1) is preferably a group including at least one cyclic structure selected from the group consisting of an aromatic hydrocarbon group, a heterocyclic group, and an alicyclic hydrocarbon group, and more preferably a group including an aromatic hydrocarbon group.

The mesogen group represented by M in General Formula (1) is preferably a group including 2 to 5 aromatic hydrocarbon groups, and more preferably a group including 3 to 5 aromatic hydrocarbon groups.

The mesogen group represented by M in General Formula (1) is preferably a group which includes 3 to 5 phenylene groups and in which the phenylene groups are linked to each other by —CO—O—.

The cyclic structure (for example, an aromatic hydrocarbon group, a heterocyclic group, and an alicyclic hydrocarbon group) included in the mesogen group represented by M in General Formula (1) may have a substituent. Examples of the substituent include an alkyl group having 1 to 10 carbon atoms (for example, a methyl group).

Specific examples of the compound represented by General Formula (1) are as follows. However, the compound represented by General Formula (1) is not limited to the compounds shown below. In the chemical structure of the compounds shown below, "-Me" represents a methyl group.

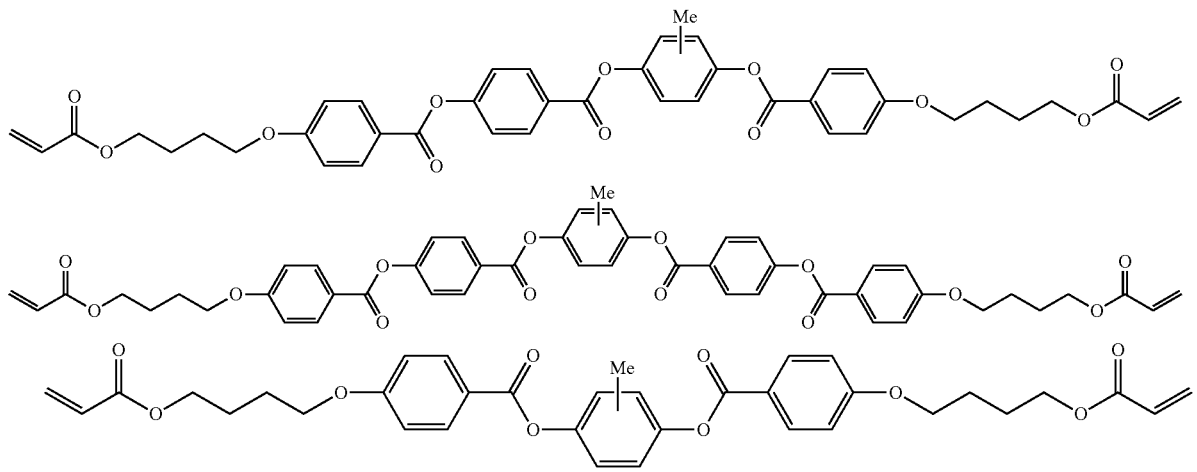

Specific examples of the rod-like thermotropic liquid crystal compound are shown below. However, the rod-like thermotropic liquid crystal compound is not limited to the compounds shown below.

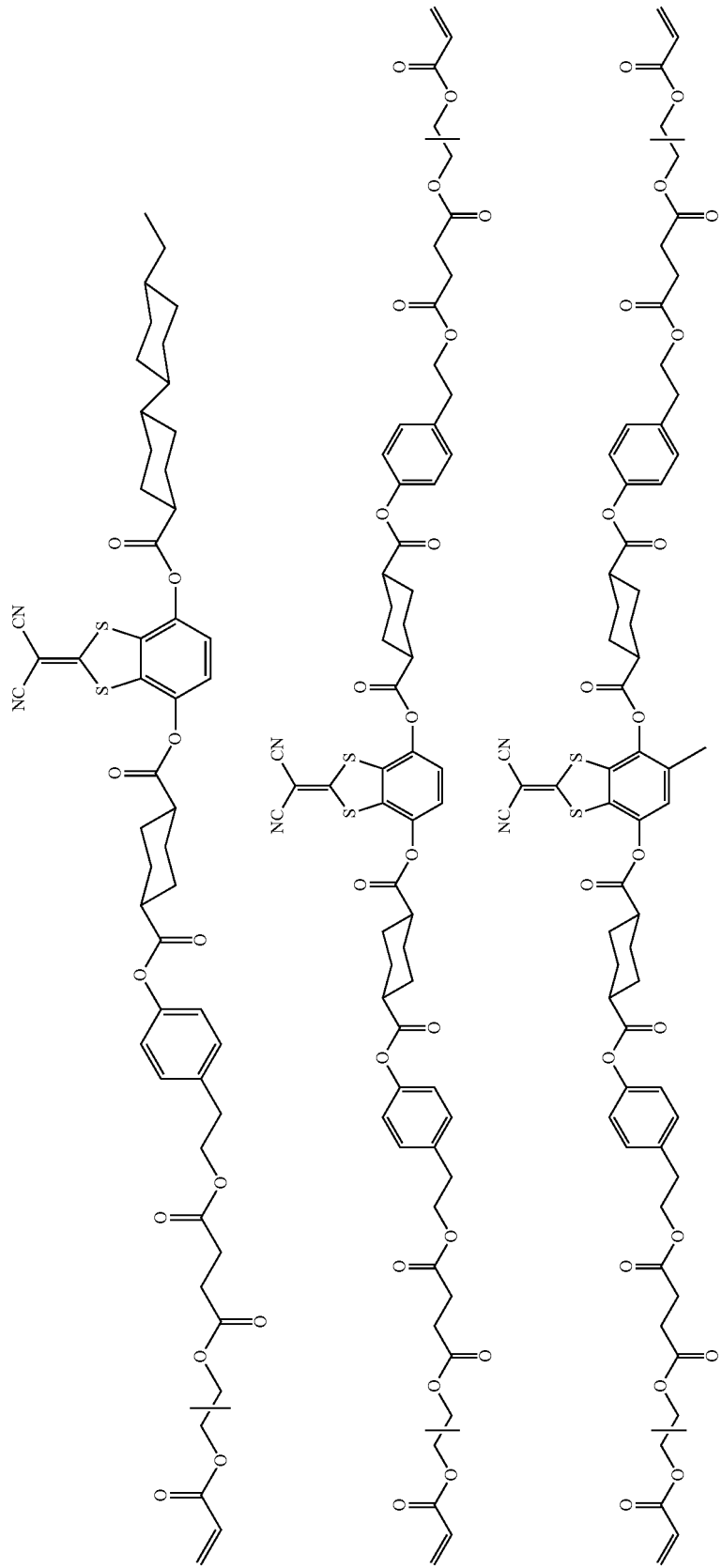

The liquid crystal compound may be a synthetic product synthesized by a known method or a commercially available product. The commercially available product of the liquid crystal compound is available from, for example, Tokyo Chemical Industry Co., Ltd. and Merck & Co., Inc.

The first liquid crystal layer may include one kind alone or two or more kinds of the liquid crystal compounds.

From the viewpoint of heat resistance, a content of the liquid crystal compound in the first liquid crystal layer is preferably 70% by mass or more, more preferably 80% by mass or more, and particularly preferably 90% by mass or more with respect to the total mass of the above-described first liquid crystal layer. The upper limit of the content of the liquid crystal compound is not limited. The content of the liquid crystal compound in the first liquid crystal layer may be determined in a range of 100% by mass or less with respect to the total mass of the above-described first liquid crystal layer. In a case where the first liquid crystal layer includes a component other than the liquid crystal compound, the content of the liquid crystal compound in the first liquid crystal layer may be less than 100% by mass, 99% by mass or less, or 96% by mass or less with respect to the total mass of the above-described first liquid crystal layer.

—Other Components—

The first liquid crystal layer may include a component other than the liquid crystal compound (hereinafter, referred to as "other components" in this paragraph). Examples of the other components include a chiral agent, a solvent, an alignment restriction agent, a polymerization initiator, a leveling agent, an alignment assistant, and a sensitizer.

[Second Cholesteric Liquid Crystal Layer]

The cholesteric liquid crystal film according to the embodiment of the present disclosure includes a second cholesteric liquid crystal layer which is disposed in contact with the first liquid crystal layer and has a stripe pattern in which dark portions and bright portions, which are observed with a microscope, are alternately arranged.

(Stripe Pattern)

A principle in which the stripe pattern is observed in the second liquid crystal layer is the same as the principle described in the above-described section of "First cholesteric liquid crystal layer".

The stripe pattern of the second liquid crystal layer may be observed on a surface of the above-described second liquid crystal layer (for example, a surface of the second liquid crystal layer opposite to a surface in contact with the first liquid crystal layer). The stripe pattern of the second liquid crystal layer may be observed in a cross section of the above-described second liquid crystal layer. It is preferable that the stripe pattern of the second liquid crystal layer is observed at least in the cross section of the second liquid crystal layer in the thickness direction.

At an interface between the first liquid crystal layer and the second liquid crystal layer, the dark portions observed in the above-described second liquid crystal layer is connected to the dark portions observed in the above-described first liquid crystal layer (hereinafter, may be referred to as a "connection of the dark portions"). In the present disclosure, the fact that "the dark portions observed in the second liquid crystal layer is connected to the dark portions observed in the first liquid crystal layer" means that, in the cross-sectional image of the liquid crystal layer in the thickness direction obtained with a scanning electron microscope or a polarization microscope, the dark portions observed in the second liquid crystal layer appears to be connected to the dark portions observed in the first liquid crystal layer, and it does not require that the two dark portions are strictly connected.

The connection of the dark portions will be described with reference to FIG. 1. FIG. 1 is a schematic cross-sectional view showing an example of the cholesteric liquid crystal film according to the embodiment of the present disclosure.

A cholesteric liquid crystal film 10 shown in FIG. 1 has a first cholesteric liquid crystal layer 20 and a second cholesteric liquid crystal layer 21. The first cholesteric liquid crystal layer 20 and the second cholesteric liquid crystal layer 21 are arranged along a lamination direction Z. The lamination direction Z is parallel to a thickness direction of the cholesteric liquid crystal film 10.

In the first cholesteric liquid crystal layer 20, a stripe pattern in which dark portions 30 and bright portions 40 are alternately arranged is observed. The dark portions 30 are inclined with respect to a main surface of the first cholesteric liquid crystal layer 20. The dark portions 30 extend in one of directions orthogonal to the lamination direction Z toward one of the lamination directions Z.

The second cholesteric liquid crystal layer 21 is disposed in contact with the first cholesteric liquid crystal layer 20. In the second cholesteric liquid crystal layer 21, a stripe pattern in which dark portions 31 and bright portions 41 are alternately arranged is observed. The dark portions 31 are inclined with respect to a main surface of the second cholesteric liquid crystal layer 21. The dark portions 31 extend in one of directions orthogonal to the lamination direction Z toward one of the lamination directions Z.

At an interface between the first cholesteric liquid crystal layer 20 and the second cholesteric liquid crystal layer 21, the dark portions 31 observed in the second cholesteric liquid crystal layer 21 are connected to the dark portions 30 observed in the first cholesteric liquid crystal layer 20.

At the interface between the first liquid crystal layer and the second liquid crystal layer, the dark portions observed in the above-described second liquid crystal layer may be connected to a part or all of the dark portions observed in the above-described first liquid crystal layer. At the interface between the first liquid crystal layer and the second liquid crystal layer, a proportion of the dark portions observed in the above-described second liquid crystal layer, which is connected to the dark portions observed in the above-described first liquid crystal layer, (hereinafter, may be referred to as a "connection rate of the dark portions") is preferably 50% to 100%, more preferably 70% to 100%, and particularly preferably 80% to 100% with respect to the number of dark portions observed in the above-described second liquid crystal layer. In a case where the connection rate of the dark portions are within the above-described range, since it is possible to further suppress the disorder of the alignment of the liquid crystal, the haze of the cholesteric liquid crystal film can be further reduced.

The connection rate of the dark portions are measured by the following method. With a scanning electron microscope or a polarization microscope, three cross-sectional images of the liquid crystal layer in the thickness direction are acquired. At the interface between the first liquid crystal layer and the second liquid crystal layer observed in each cross-sectional image, the proportion of the dark portions observed in the above-described second liquid crystal layer, which is connected to the dark portions observed in the above-described first liquid crystal layer, is calculated according to the following expression. A value obtained by arithmetically averaging the measured values is defined as the connection rate of the dark portions.

([Number of dark portions observed in second liquid crystal layer connected to dark portions observed in first liquid crystal layer]/[Number of dark portions observed in second liquid crystal layer])×100        Expression:

It is preferable that, in the cross-sectional view in the thickness direction, the dark portions observed in the second liquid crystal layer is inclined with respect to the main surface of the above-described second liquid crystal layer. As described in the above section of "First cholesteric liquid crystal layer", according to the above-described aspect, for example, the circular polarization degree of light reflected by the reflecting surface derived from the cholesteric liquid crystal is increased. From the same viewpoint, in the cross-sectional view in the thickness direction, it is more preferable that the dark portions observed in the first liquid crystal layer is inclined with respect to the main surface of the first liquid crystal layer and the dark portions observed in the second liquid crystal layer is inclined with respect to the main surface of the above-described second liquid crystal layer. Further, in the cross-sectional view in the thickness direction, it is preferable that an inclined direction of the dark portions observed in the second liquid crystal layer is the same as an inclined direction of the dark portions observed in the first liquid crystal layer. In the present disclosure, the fact that "the inclined direction of the dark portions observed in the second liquid crystal layer is the same as the inclined direction of the dark portions observed in the first liquid crystal layer" means that, at the interface between the first liquid crystal layer and the second liquid crystal layer, in the dark portions observed in the first liquid crystal layer and the dark portions observed in the second liquid crystal layer, which are connected to each other, an angle between a straight line (virtual line) passing through both ends in the longitudinal direction of the dark portions observed in the first liquid crystal layer and a straight line (virtual line) passing through both ends in the longitudinal direction of the dark portions observed in the second liquid crystal layer is in a range of 100° to 180°. The angle formed by the two straight lines described above is preferably in a range of 120° to 180° and more preferably in a range of 150° to 180°.

In the cross-sectional view in the thickness direction, the fact that the dark portions observed in the second liquid crystal layer is inclined with respect to the main surface of the above-described second liquid crystal layer (hereinafter, in this paragraph, referred to as an "inclination of the dark portions") may be observed in at least one cross-sectional view of the liquid crystal layer in the thickness direction. For example, even in a case where the inclination of the dark portions are not observed in any one cross-sectional view, the inclination of the dark portions may be observed in the other cross-sectional view.

An angle of the dark portions observed in the second liquid crystal layer is not limited. In the cross-sectional view in the thickness direction, from the viewpoint of uniformity of an inclined angle of the helical axis, an average angle of the dark portions observed in the second liquid crystal layer is preferably 10° or more, more preferably 20° or more, and particularly preferably 30° or more with respect to the main surface of the above-described second liquid crystal layer. In the cross-sectional view in the thickness direction, the average angle of the dark portions observed in the second liquid crystal layer is preferably 90° or less with respect to the main surface of the above-described second liquid crystal layer.

In the cross-sectional view in the thickness direction, the average angle of the dark portions observed in the second liquid crystal layer is measured by a method according to the method for measuring the average angle of the dark portions observed in the first liquid crystal layer, which is described in the above section of "First cholesteric liquid crystal layer".

In the cross-sectional view in the thickness direction, the average angle of the dark portions observed in the second liquid crystal layer may be the same as the average angle of the dark portions observed in the first liquid crystal layer, or may be different from the average angle of the dark portions observed in the first liquid crystal layer.

A width of the dark portions observed in the second liquid crystal layer is not limited. In the cross-sectional view in the thickness direction, a distance between two adjacent dark portions in the dark portions observed in the second liquid crystal layer is preferably 0.05 µm or more, more preferably 0.1 µm or more, and particularly preferably 0.15 µm or more. In the cross-sectional view in the thickness direction, the distance between two adjacent dark portions in the dark portions observed in the second liquid crystal layer is preferably 500 µm or less, more preferably 100 µm or less, still more preferably 15 µm or less, and particularly preferably 5 µm or less.

In the cross-sectional view in the thickness direction, the distance between two adjacent dark portions in the dark portions observed in the second liquid crystal layer is measured by a method according to the method for measuring the distance between dark portions, which is described in the above section of "First cholesteric liquid crystal layer".

In the cross-sectional view in the thickness direction, the distance between two adjacent dark portions in the dark portions observed in the second liquid crystal layer may be the same as the distance between two adjacent dark portions in the dark portions observed in the first liquid crystal layer, or may be different from the distance between two adjacent dark portions in the dark portions observed in the first liquid crystal layer. In the cross-sectional view in the thickness direction, from the viewpoint of improving the connection rate of the dark portions, it is preferable that the distance between two adjacent dark portions in the dark portions observed in the second liquid crystal layer is different from the distance between two adjacent dark portions in the dark portions observed in the first liquid crystal layer. Specifically, in the cross-sectional view in the thickness direction, it is preferable that the distance between two adjacent dark portions in the dark portions observed in the second liquid crystal layer is larger than the distance between two adjacent dark portions in the dark portions observed in the first liquid crystal layer.

In the cross-sectional view in the thickness direction, from the viewpoint of improving the connection rate of the dark portions, a ratio of the distance between two adjacent dark portions in the dark portions observed in the second liquid crystal layer to the distance between two adjacent dark portions in the dark portions observed in the first liquid crystal layer is preferably 0.8 to 5, more preferably 0.9 to 3, and particularly preferably 1 to 2. Further, in the cross-sectional view in the thickness direction, the ratio of the distance between two adjacent dark portions in the dark portions observed in the second liquid crystal layer to the distance between two adjacent dark portions in the dark portions observed in the first liquid crystal layer is preferably 1.1 to 2, more preferably 1.2 to 2, and particularly preferably 1.3 to 2.

It is preferable that liquid crystal compounds observed in the surface of the second liquid crystal layer opposite to the surface in contact with the first liquid crystal layer are arranged while being twisted along one direction of in-plane directions of the above-described second liquid crystal layer. By arranging the liquid crystal compounds as described above, since a linearity of the dark portions and the bright portions observed in the cross section in the thickness direction is high, the haze of the cholesteric liquid crystal film can be smaller.

(Thickness)

A thickness of the second liquid crystal layer is not limited. From the viewpoint of suppressing an influence of smoothness of a surface shape of a layer adjacent to the second liquid crystal layer (for example, the first liquid crystal layer), an average thickness of the second liquid crystal layer is preferably 0.1 µm or more, more preferably 0.5 µm or more, and particularly preferably 1 µm or more. From the viewpoint of transparency, the average thickness of the second liquid crystal layer is preferably 500 µm or less, more preferably 100 µm or less, and particularly preferably 20 µm or less.

The average thickness of the second liquid crystal layer is measured by a method according to the method for measuring the average thickness of the first liquid crystal layer, which is described in the above section of "First cholesteric liquid crystal layer".

The thickness of the second liquid crystal layer may be the same as the thickness of the first liquid crystal layer, or may be different from the thickness of the first liquid crystal layer. A ratio of the thickness of the second liquid crystal layer to the thickness of the first liquid crystal layer is preferably 0.1 to 10, more preferably 0.2 to 5, and particularly preferably 0.3 to 3.

(Composition)

Composition of the second liquid crystal layer is not limited as long as the stripe pattern in which the dark portions and the bright portions are alternately arranged is observed. Hereinafter, components of the second liquid crystal layer will be specifically described.

—Liquid Crystal Compound—

The second liquid crystal layer preferably includes a liquid crystal compound. Examples of the liquid crystal compound include the liquid crystal compound described in the above section of "First cholesteric liquid crystal layer". Preferred aspects of the liquid crystal compound are the same as the preferred aspects of the liquid crystal compound described in the above section of "First cholesteric liquid crystal layer".

The second liquid crystal layer may include one kind alone or two or more kinds of the liquid crystal compounds.

From the viewpoint of heat resistance, a content of the liquid crystal compound in the second liquid crystal layer is preferably 70% by mass or more, more preferably 80% by mass or more, and particularly preferably 90% by mass or more with respect to the total mass of the above-described second liquid crystal layer. The upper limit of the content of the liquid crystal compound is not limited. The content of the liquid crystal compound in the second liquid crystal layer may be determined in a range of 100% by mass or less with respect to the total mass of the above-described second liquid crystal layer. In a case where the second liquid crystal layer includes a component other than the liquid crystal compound, the content of the liquid crystal compound in the second liquid crystal layer may be less than 100% by mass, 99% by mass or less, or 96% by mass or less with respect to the total mass of the above-described second liquid crystal layer.

—Other Components—

The second liquid crystal layer may include a component other than the liquid crystal compound (hereinafter, referred to as "other components" in this paragraph). Examples of the other components include a chiral agent, a solvent, an alignment restriction agent, a polymerization initiator, a leveling agent, an alignment assistant, and a sensitizer.

[Other Constituent Elements]

Constituent elements of the cholesteric liquid crystal film according to the embodiment of the present disclosure are not limited as long as they include the first liquid crystal layer and the second liquid crystal layer. The cholesteric liquid crystal film according to the embodiment of the present disclosure may have a constituent element other than the first liquid crystal layer and the second liquid crystal layer.

(Other Cholesteric Liquid Crystal Layers)

The cholesteric liquid crystal film according to the embodiment of the present disclosure may include a cholesteric liquid crystal layer (hereinafter, also referred to as "other cholesteric liquid crystal layers") other than the first liquid crystal layer and the second liquid crystal layer as necessary. In other words, the cholesteric liquid crystal film according to the embodiment of the present disclosure may include three or more cholesteric liquid crystal layers including the first liquid crystal layer and the second liquid crystal layer.

In the cholesteric liquid crystal film including three or more cholesteric liquid crystal layers, an aspect of the other cholesteric liquid crystal layers is not limited as long as at least two cholesteric liquid crystal layers correspond to the first liquid crystal layer and the second liquid crystal layer. Preferred aspects of the other cholesteric liquid crystal layers are the same as the preferred aspects of the first liquid crystal layer described in the above section of "First cholesteric liquid crystal layer" or as the preferred aspects of the second liquid crystal layer described in the above section of "Second cholesteric liquid crystal layer".

In the cholesteric liquid crystal film including three or more cholesteric liquid crystal layers, a combination of cholesteric liquid crystal layers corresponding to the first liquid crystal layer and the second liquid crystal layer may be plural. For example, in a cholesteric liquid crystal film having a structure in which three cholesteric liquid crystal layers are stacked, a first cholesteric liquid crystal layer and a second cholesteric liquid crystal layer may correspond to the first liquid crystal layer and the second liquid crystal layer, respectively, or a second cholesteric liquid crystal layer and a third cholesteric liquid crystal layer may correspond to the first liquid crystal layer and the second liquid crystal layer, respectively.

In a case where the cholesteric liquid crystal film includes three or more cholesteric liquid crystal layers, it is preferable that all the cholesteric liquid crystal layers are stacked.

(Substrate)

The cholesteric liquid crystal film according to the embodiment of the present disclosure may include a substrate. With the substrate, strength of the cholesteric liquid crystal film can be improved.

The substrate may be disposed on a surface of the first liquid crystal layer opposite to a surface in contact with the second liquid crystal layer. The substrate may be disposed on a surface of the second liquid crystal layer opposite to a surface in contact with the first liquid crystal layer. The cholesteric liquid crystal film according to the embodiment of the present disclosure preferably includes the substrate, the first liquid crystal layer, and the second liquid crystal layer in this order.

The total light transmittance of the substrate is preferably 80% or more, more preferably 85% or more, and particularly preferably 90% or more. The upper limit of the total light transmittance of the substrate is not limited. The total light transmittance of the substrate may be determined, for example, in a range of 100% or less. The total light transmittance of the substrate is measured using a known spectrophotometer (for example, a haze meter NDH 2000, Nippon Denshoku Industries Co., Ltd.).

The substrate is preferably a substrate including a polymer. Examples of the substrate including a polymer include a polyester-based substrate (for example, polyethylene terephthalate and polyethylene naphthalate), a cellulose-based substrate (for example, diacetyl cellulose and triacetyl cellulose (abbreviation: TAC)), a polycarbonate-based substrate, a poly(meth)acrylic substrate (for example, poly (meth)acrylate (such as polymethylmethacrylate)), a polystyrene-based substrate (for example, polystyrene and an acrylonitrile-styrene copolymer), an olefin-based substrate (for example, polyethylene, polypropylene, polyolefin having a cyclic structure (for example, a norbornene structure), and an ethylene-propylene copolymer), a polyamide-based substrate (for example, polyvinyl chloride, nylon, and aromatic polyamide), a polyimide-based substrate, a polysulfone-based substrate, a polyether sulfone-based substrate, a polyether ether ketone-based substrate, a polyphenylene sulfide-based substrate, a vinyl alcohol-based substrate, a polyvinylidene chloride-based substrate, a polyvinyl butyral-based substrate, a polyoxymethylene-based substrate, and an epoxy resin-based substrate. The substrate may be a substrate including two or more kinds of polymers (that is, a blend polymer). The substrate is preferably a cellulose-based substrate, and more preferably a substrate including triacetyl cellulose.

A shape of the substrate is not limited. The shape of the substrate may be determined, for example, according to the application and the installation location. The substrate is preferably a flat plate-shaped substrate.

From the viewpoint of manufacturing suitability, manufacturing cost, and optical characteristics, a thickness of the substrate is preferably in a range of 30 µm to 250 µm, and more preferably 40 µm to 100 µm.

(Alignment Layer)

The cholesteric liquid crystal film according to the embodiment of the present disclosure may include an alignment layer. With the alignment layer, an alignment restriction force can be applied to the liquid crystal compound.

The alignment layer is preferably disposed between the substrate and the cholesteric liquid crystal layer (preferably the first liquid crystal layer or the second liquid crystal layer). The cholesteric liquid crystal film according to the embodiment of the present disclosure preferably includes the substrate, the alignment layer, the first liquid crystal layer, and the second liquid crystal layer in this order.

As the alignment layer, for example, a known alignment layer having a function of applying the alignment restriction force to the liquid crystal compound can be used. The alignment layer may be an alignment layer in which the alignment function is generated by applying an electric field, applying a magnetic field, or irradiating light.

A thickness of the alignment layer is preferably in a range of 0.1 µm to 10 µm, and more preferably in a range of 1 µm to 5 µm.

[Shape]

A shape of the cholesteric liquid crystal film according to the embodiment of the present disclosure is not limited. Examples of the shape of the cholesteric liquid crystal film in a plan view include a round shape (for example, a perfect circle and an ellipse), a polygonal shape (for example, a triangle, a quadrangle, a pentagon, and a hexagon), and an indefinite shape.

[Thickness]

A thickness of the cholesteric liquid crystal film according to the embodiment of the present disclosure is not limited. The thickness of the cholesteric liquid crystal film according to the embodiment of the present disclosure is preferably in a range of 1 µm to 500 µm, more preferably in a range of 2 µm to 250 µm, and particularly preferably in a range of 5 µm, to 100 µm.

[Application]

An application of the cholesteric liquid crystal film according to the embodiment of the present disclosure is not limited. Examples of the application of the cholesteric liquid crystal film according to the embodiment of the present disclosure include an optical film. The cholesteric liquid crystal film according to the embodiment of the present disclosure may be used, for example, as an optical film used for an aerial imaging device, a transparent screen, or an optical sensor member.

[Manufacturing Method]

Hereinafter, a manufacturing method of the cholesteric liquid crystal film according to the embodiment of the present disclosure will be described. However, the manufacturing method of the cholesteric liquid crystal film according to the embodiment of the present disclosure is not limited to the method described below.

The manufacturing method of the cholesteric liquid crystal film according to the embodiment of the present disclosure preferably includes a step (hereinafter, may be referred to as a "step (A1)") of applying a first composition including a liquid crystal compound and a chiral agent onto a substrate; a step (hereinafter, may be referred to as a "step (B1)") of applying a shearing force to a surface of the first composition applied onto the substrate; a step (hereinafter, may be referred to as a "step (C1)") of curing the first composition to which the shearing force is applied to form a first cholesteric liquid crystal layer; a step (hereinafter, may be referred to as a "step (A2)") of applying a second composition including a liquid crystal compound and a chiral agent onto the first cholesteric liquid crystal layer; a step (hereinafter, may be referred to as a "step (B2)") of applying a shearing force to a surface of the second composition applied onto the first cholesteric liquid crystal layer; and a step (hereinafter, may be referred to as a "step (C2)") of curing the second composition to which the shearing force is applied to form a second cholesteric liquid crystal layer. According to the manufacturing method including the above-described steps, a cholesteric liquid crystal film with a small haze can be manufactured. In the following description, in a case where it is not necessary to clearly distinguish the first composition and the second composition, the first composition and the second composition may be collectively referred to as a "composition".

(Step (A1))

In the step (A1), a first composition including a liquid crystal compound and a chiral agent is applied onto a substrate.

In the present disclosure, the fact "applying the first composition onto the substrate" is not limited to bringing the first composition into direct contact with the substrate, but includes contacting the substrate with the first composition through any layer. The any layer may be one of constituent elements of the substrate, or may be a layer formed on the substrate prior to application of the composition. Examples of the any layer include the alignment layer described in the above section of "Alignment layer". A method for forming the alignment layer will be described later.

—Substrate—

Examples of the substrate include the substrate described in the above section of "Substrate". Preferred aspects (for example, total light transmittance, type, shape, and thickness) of the substrate are the same as the preferred aspects of the substrate described in the above section of "Substrate". An alignment layer may be disposed in advance on a surface of the substrate. In a case where the alignment layer is disposed on the surface of the substrate, the first composition is applied onto the alignment layer.

—Liquid Crystal Compound—

As the liquid crystal compound, for example, the liquid crystal compound described in the above section of "First cholesteric liquid crystal layer" can be used. Preferred aspects of the liquid crystal compound are the same as the preferred aspects of the liquid crystal compound described in the above section of "First cholesteric liquid crystal layer".

The first composition may include one kind alone or two or more kinds of the liquid crystal compounds.

From the viewpoint of heat resistance, a content of the liquid crystal compound in the first composition is preferably 70% by mass or more, more preferably 80% by mass or more, and particularly preferably 90% by mass or more with respect to the mass of the solid content of the above-described first composition. The upper limit of the content of the liquid crystal compound is not limited. The content of the liquid crystal compound in the first composition may be less than 100% by mass, 99% by mass or less, or 96% by mass or less with respect to the mass of the solid content of the above-described first composition.

—Chiral Agent—

The type of the chiral agent is not limited. As the chiral agent, for example, a known chiral agent (for example, chiral agents described in "Liquid Crystal Device Handbook, chapter 3, section 4-3, chiral agents for TN and STN, page 199, Japan Society for the Promotion of Science edited by the 142nd committee, 1989" can be used.

Many chiral agents include an asymmetric carbon atom. However, the chiral agent is not limited to compounds including an asymmetric carbon atom. Examples of the chiral agent include an axial asymmetric compound not including an asymmetric carbon atom and a planar asymmetric compound. Examples of the axial asymmetric compound or the planar asymmetric compound include binaphthyl, helicene, paracyclophane, and derivatives thereof.

The chiral agent may have a polymerizable group. For example, by a reaction of the chiral agent having a polymerizable group and the liquid crystal compound having a polymerizable group, a polymer having a constitutional unit derived from the chiral agent and a constitutional unit derived from the liquid crystal compound is obtained.

Examples of the polymerizable group in the chiral agent include the polymerizable group described in the above section of "Liquid crystal compound". Preferred aspects of the polymerizable group in the chiral agent are the same as the preferred aspects of the polymerizable group described in the above section of "Liquid crystal compound". The type of the polymerizable group in the chiral agent is preferably the same as the type of the polymerizable group in the liquid crystal compound.

Examples of a chiral agent exhibiting a strong twisting force include chiral agents described in JP2010-181852A, JP2003-287623A, JP2002-80851A, JP2002-80478A, and JP2002-302487A. For isosorbide compounds described in the above-mentioned documents, isomannide compounds having the corresponding structure can also be used as the chiral agent. In addition, for isomannide compounds described in the above-mentioned documents, isosorbide compounds having the corresponding structure can also be used as the chiral agent.

The first composition may include one kind alone or two or more kinds of the chiral agents.

A content of the chiral agent is preferably 0.1% by mass to 20.0% by mass, more preferably 0.2% by mass to 15.0% by mass, and particularly preferably 0.5% by mass to 10.0% by mass with respect to the mass of solid content of the first composition.

—Other Components—

The first composition may include a component other than the above-described components (hereinafter, referred to as "other components" in this paragraph). Examples of the other components include a solvent, an alignment restriction agent, a polymerization initiator, a leveling agent, an alignment assistant, and a sensitizer.

As the solvent, an organic solvent is preferable. Examples of the organic solvent include an amide solvent (for example, N,N-dimethylformamide), a sulfoxide solvent (for example, dimethyl sulfoxide), a heterocyclic compound (for example, pyridine), a hydrocarbon solvent (for example, benzene and hexane), an alkyl halide solvent (for example, chloroform and dichloromethane), an ester solvent (for example, methyl acetate and butyl acetate), a ketone solvent (for example, acetone, methyl ethyl ketone, and cyclohexanone), and an ether solvent (for example, tetrahydrofuran and 1,2-dimethoxyethane). The organic solvent is preferably at least one selected from the group consisting of an alkyl halide solvent and a ketone solvent, and more preferably a ketone solvent.

The first composition may include one kind alone or two or more kinds of the solvents.

A content of solid content in the first composition is preferably 25% by mass to 40% by mass and more preferably 25% by mass to 35% by mass with respect to the total mass of the first composition.

Examples of the alignment restriction agent include compounds described paragraphs [0012] to [0030] of JP2012-211306A, compounds described in paragraphs [0037] to [0044] of JP2012-101999A, fluorine-containing (meth)acrylate polymers described in paragraphs [0018] to [0043] of JP2007-272185A, and compounds described in detail in JP2005-099258A together with a synthesis method. A polymer including a polymerization unit of a fluoroaliphatic group-containing monomer in an amount of more than 50% by mass of the total polymerization unit, which is described in JP2004-331812A, may be used as the alignment restriction agent.

Examples of the alignment restriction agent also include a vertical alignment agent. Examples of the vertical alignment agent include a boronic acid compound and/or onium salt described in JP2015-38598A and an onium salt described in JP2008-26730A.

In a case where the first composition contains an alignment restriction agent, a content of the alignment restriction agent is preferably more than 0% by mass and 5.0% by mass or less, and more preferably 0.3% by mass to 2.0% by mass with respect to the mass of solid content of the first composition.

Examples of the polymerization initiator include a photopolymerization initiator and a thermal polymerization initiator.

From the viewpoint of suppressing deformation of the substrate due to heat and deterioration of the first composition, the polymerization initiator is preferably a photopolymerization initiator. Examples of the photopolymerization initiator include α-carbonyl compounds (for example, compounds described in U.S. Pat. Nos. 2,367,661A and 2,367,670A), acyloin ethers (for example, compounds described in U.S. Pat. No. 2,448,828A), α-hydrocarbon-substituted aromatic acyloin compounds (for example, compounds described in U.S. Pat. No. 2,722,512A), polynuclear quinone compounds (for example, compounds described in U.S. Pat. Nos. 3,046,127A and 2,951,758A), combinations of a triarylimidazole dimer and a p-aminophenylketone (for example, compounds described in U.S. Pat. No. 3,549,367A), acridine compounds (for example, compounds described in JP1985-105667A (JP-S60-105667A) and U.S. Pat. No. 4,239,850A), phenazine compounds (for example, compounds described in JP1985-105667A (JP-S60-105567A) and U.S. Pat. No. 4,239,850A), oxadiazole compounds (for example, compounds described in U.S. Pat. No. 4,212,970A), and acylphosphine oxide compounds (for example, compounds described in JP1988-40799B (JP-S63-40799B), JP1993-29234B (JP-H5-29234B), JP1998-95788A (JP-H10-95788A), and JP1998-29997A (JP-H10-29997A)).

In a case where the first composition contains a polymerization initiator, a content of the polymerization initiator is preferably 0.5% by mass to 5.0% by mass, and more preferably 1.0% by mass to 4.0% by mass with respect to the mass of solid content of the first composition.

—Producing Method of First Composition—

A producing method of the first composition is not limited. Examples of the producing method of the first composition include a method of mixing the above-described components. As the mixing method, a known mixing method can be used. In the producing method of the first composition, a mixture obtained by mixing the above-described respective components may be filtered.

—Applying Method—

An applying method of the first composition is not limited. Examples of the applying method of the first composition include an extrusion die coater method, a curtain coating method, a dip coating method, a spin coating method, a printing coating method, a spray coating method, a slot coating method, a roll coating method, a slide coating method, a blade coating method, a gravure coating method, and a wire bar coating method.

—Applying Amount—

An applying amount of the first composition is not limited. The applying amount of the first composition may be determined, for example, depending on the target thickness of the cholesteric liquid crystal layer or the thickness of the first composition before applying the shearing force described in the section of "Step (B1)" below.

(Step (B1))

In the step (B1), a shearing force is applied to a surface of the first composition applied onto the substrate. According to the step (B1), a variation in the orientation of the helical axis can be reduced.

—Unit for Applying Shearing Force—

Examples of a unit for applying the shearing force include blades, air knives, bars, and applicators. In the step (B1), it is preferable to apply the shearing force to the surface of the first composition using a blade or an air knife, and it is more preferable to apply the shearing force to the surface of the first composition using a blade.

In the method of applying the shearing force to the surface of the first composition using a blade, it is preferable to scrape the surface of the first composition with the blade. In the above-described method, the thickness of the first composition may change before and after applying the shearing force. The thickness of the first composition after applying the shearing force with the blade may be ½ or less or ⅓ or less of the thickness of the first composition before applying the shearing force. The thickness of the first composition after applying the shearing force with the blade is preferably ¼ or more of the thickness of the first composition before applying the shearing force.

A material of the blade is not limited. Examples of the material of the blade include metals (for example, stainless steel) and resins (for example, TEFLON (registered trademark) and polyetheretherketone (PEEK)).

A shape of the blade is not limited. Examples of the shape of the blade include a plate shape.

From the viewpoint of easily applying the shearing force to the first composition, the blade is preferably a metal plate-shaped member.

From the viewpoint of easily applying the shearing force to the first composition, a thickness of a tip part of the blade in contact with the first composition is preferably 0.1 mm or more and more preferably 1 mm or more. The upper limit of the thickness of the blade is not limited. The thickness of the blade may be determined, for example, in a range of 10 mm or less.

In the method of applying the shearing force to the surface of the first composition using an air knife, by blowing compressed air to the surface of the first composition with the air knife, the shearing force is applied to the surface of the first composition. A shear rate applied to the first composition can be adjusted according to a rate (that is, a flow velocity) at which the compressed air is blown.

A blowing direction of the compressed air by the air knife may be the same direction as or opposite to a transport direction of the first composition. From the viewpoint of preventing fragments of the first composition scraped off by the compressed air from adhering to the first composition remaining on the substrate, the blowing direction of the compressed air by the air knife is preferably the same as the transport direction of the first composition.

—Shear Rate—

As the shear rate in the step (B1) is higher, a cholesteric liquid crystal layer having high alignment accuracy can be formed. The shear rate is preferably 1,000 seconds$^{-1}$ or more, more preferably 10,000 seconds$^{-1}$ or more, and particularly preferably 30,000 seconds$^{-1}$ or more. The upper limit of the shear rate is not limited. The shear rate may be determined, for example, in a range of $1.0 \times 10^6$ seconds$^{-1}$ or less.

Hereinafter, how to obtain the shear rate will be described. For example, in a case where the shearing force is applied using a blade, the shear rate is determined by "V/d" in a case where the shortest distance between the blade and the substrate is defined as "d" and a transportation speed of the first composition in contact with the blade (that is, a relative speed between the first composition and the blade) is defined as "V". In addition, for example, in a case where the shearing force is applied using an air knife, the shear rate is determined by "V/2h" in a case where the thickness of the first composition after applying the shearing force is defined as "h" and a relative speed between the surface of the first composition and the surface of the substrate is defined as "V".

—Surface Temperature of First Composition—

A surface temperature of the first composition in a case of applying the shearing force may be determined according to a phase transition temperature of the liquid crystal compound included in the first composition. The surface temperature of the first composition in a case of applying the shearing force is preferably 50° C. to 120° C. and more preferably 60° C. to 100° C. By adjusting the surface temperature of the first composition within the above-described range, a cholesteric liquid crystal layer having high alignment accuracy can be obtained. The surface temperature of the first composition is measured using a radiation thermometer in which emissivity is calibrated by a temperature value measured by a noncontact thermometer. The surface temperature of the first composition is measured within 10 cm from the surface on the side (that is, a back side) opposite to the measurement surface without any reflector.

—Thickness of First Composition—

From the viewpoint of forming a cholesteric liquid crystal layer having high alignment accuracy, the thickness of the first composition before applying the shearing force is preferably in a range of 30 μm or less and more preferably in a range of 15 μm to 25 μm.

From the viewpoint of forming a cholesteric liquid crystal layer having high alignment accuracy, the thickness of the first composition after applying the shearing force is preferably in a range of 10 μm or less and more preferably in a range of 7 μm or less. The lower limit of the thickness of the first composition after applying the shearing force is not limited. The thickness of the first composition after applying the shearing force is preferably in a range of 5 μm or more.

(Step (C1))

In the step (C1), the first composition to which the shearing force is applied is cured to form a first cholesteric liquid crystal layer.

Examples of a method for curing the first composition include heating and irradiation with active energy ray. In the step (C1), from the viewpoint of manufacturing suitability, it is preferable to cure the above-described composition by irradiating the first composition to which the shearing force is applied with active energy ray.

Examples of the active energy ray include α rays, γ rays, X-rays, ultraviolet rays, infrared rays, visible light rays, and electron beam. From the viewpoint of curing sensitivity and availability of equipment, the active energy ray is preferably ultraviolet rays.

Examples of a light source of ultraviolet rays include lamps (for example, a tungsten lamp, a halogen lamp, a xenon lamp, a xenon flash lamp, a mercury lamp, a mercury-xenon lamp, and a carbon arc lamp), lasers (for example, semiconductor laser, helium neon laser, argon ion laser, helium cadmium laser, and Yttrium Aluminum Garnet (YAG) laser), light emitting diodes, and cathode ray tube.

A peak wavelength of the ultraviolet rays emitted from the light source of ultraviolet rays is preferably 200 nm to 400 nm.

An exposure amount (also referred to as an integrated light amount) of ultraviolet rays is preferably 100 mJ/cm² to 500 mJ/cm².

(Step (A2))

In the step (A2), a second composition including a liquid crystal compound and a chiral agent is applied onto the first cholesteric liquid crystal layer.

The matters described in the above section of "Step (A1)" (excluding matters relating to the substrate) are adopted to the step (A2). Preferred aspects of the step (A2) are the same as the preferred aspects of the step (A1).

(Step (B2))

In the step (B2), a shearing force is applied to a surface of the second composition applied onto the first cholesteric liquid crystal layer. According to the step (B2), since a variation in the orientation of the helical axis can be reduced, the connection rate of the dark portions can be improved.

The matters described in the above section of "Step (B1)" are adopted to the step (B2). Preferred aspects of the step (B2) are the same as the preferred aspects of the step (B1).

(Step (C2))

In the step (C2), the second composition to which the shearing force is applied is cured to form a second cholesteric liquid crystal layer.

The matters described in the above section of "Step (C1)" are adopted to the step (C2). Preferred aspects of the step (C2) are the same as the preferred aspects of the step (C1).

(Other Steps)

The manufacturing method of the cholesteric liquid crystal film according to the embodiment of the present disclosure may include a step other than the above-described steps.

—Step (D)—

For example, the manufacturing method of the cholesteric liquid crystal film according to the embodiment of the present disclosure may include a step (hereinafter, may be referred to as a "step (D)") of forming an alignment layer on the substrate. It is preferable that the step (D) is performed before the step (A1).

Examples of a method for forming the alignment layer include a rubbing treatment of an organic compound (preferably, a polymer), an orthorhombic deposition of an inorganic compound, and a formation of a layer having a microgroove.

—Step (E)—

In a case where the composition includes a solvent, the manufacturing method of the cholesteric liquid crystal film according to the embodiment of the present disclosure preferably includes a step (hereinafter, may be referred to as a "step (E)") of, before applying the shearing force to the surface of the composition, adjusting the content of the solvent in the composition to a range of 50% by mass or less with respect to the total mass of the composition. Specifically, the manufacturing method of the cholesteric liquid crystal film according to the embodiment of the present disclosure preferably includes, between the step (A1) and the step (B1), a step of adjusting the content of the solvent in the first composition applied onto the substrate to a range of 50% by mass or less with respect to the total mass of the composition. The manufacturing method of the cholesteric liquid crystal film according to the embodiment of the present disclosure preferably includes, between the step (A2) and the step (B2), a step of adjusting the content of the solvent in the second composition applied onto the first cholesteric liquid crystal layer to a range of 50% by mass or less with respect to the total mass of the composition.

The step (E) may be performed between the step (A1) and the step (B1), or between the step (A2) and the step (B2). The step (E) may be performed between the step (A1) and the step (B1) and between the step (A2) and the step (B2).

In the step (E), the content of the solvent in the composition is preferably 40% by mass or less and more preferably 30% by mass or less with respect to the total mass of the above-described composition. The lower limit of the content of the solvent in the composition is not limited. The content of the solvent in the composition may be 0% by mass or more than 0% by mass with respect to the total mass of the above-described composition. From the viewpoint that it is easy to suppress deterioration of a surface condition of the composition, the content of the solvent in the composition is preferably 10% by mass or more.

The content of the solvent in the composition is measured by an absolute dry method. Hereinafter, a specific procedure of the measuring method will be described. After drying a sample collected from the composition at 60° C. for 24 hours, a mass change of the sample before and after drying (that is, a difference between the mass of the sample after drying and the mass of the sample before drying) is determined. An arithmetic mean of the values obtained by performing the above-described operation three times is defined as the content of the solvent.

In the step (E), examples of a method for adjusting the content of the solvent in the composition include drying.

As a unit for drying the composition, a known drying unit can be used. Examples of the drying unit include an oven, a hot air blower, and an infrared (IR) heater.

In the drying using a hot air blower, a hot air may be blown directly onto the composition, or a hot air may be blown onto the surface opposite to the surface on which the composition of the substrate is disposed. In addition, a diffusion plate may be installed in order to prevent the surface of the composition from flowing due to the hot air.

The drying may be performed by inhalation. For the drying by inhalation, for example, a decompression chamber having a discharge mechanism can be used. By inhaling gas around the composition, the content of the solvent in the composition can be reduced.

The drying conditions are not limited as long as the content of the solvent in the composition can be adjusted to the range of 50% by mass or less. The drying conditions may be determined, for example, according to the components included in the composition, the applying amount of the composition, and the transportation speed.

(Manufacturing System)

The manufacturing method of the cholesteric liquid crystal film according to the embodiment of the present disclosure may be performed by a roll-to-roll system. In the roll-to-roll system, for example, each step is carried out while continuously transporting a long substrate. The manufacturing method of the cholesteric liquid crystal film according to the embodiment of the present disclosure may be performed using a substrate which is conveyed one by one.

EXAMPLES

Hereinafter, the present disclosure will be described in detail according to Examples. However, the present disclosure is not limited to the following Examples.

Example 1

A cholesteric liquid crystal film of Example 1 was manufactured by the following procedure. The cholesteric liquid crystal film of Example 1 includes a substrate, an alignment layer, a first cholesteric liquid crystal layer, and a second cholesteric liquid crystal layer in this order.

[Preparation of Substrate]

As the substrate, a triacetyl cellulose (TAC) film (Fujifilm Corporation, refractive index: 1.48, thickness: 40 µm) was prepared.

[Formation of Alignment Layer]

A composition for forming an alignment layer was prepared by stirring a mixture including pure water (96 parts by mass) and PVA-205 (4 parts by mass, Kuraray Co., Ltd., polyvinyl alcohol) in a container kept warm at 80° C. Using a bar (bar count: 6), the above-described composition for forming an alignment layer was applied onto the substrate (triacetyl cellulose film), and then dried in an oven at 100° C. for 10 minutes. By the above-described procedure, an alignment layer (thickness: 2 µm) was formed on the substrate.

[Formation of First Cholesteric Liquid Crystal Layer]

By the following procedure, a first cholesteric liquid crystal layer (thickness: 8 µm) was formed on the alignment layer.

(Preparation of Coating Liquid (1) for Forming Liquid Crystal Layer)

After mixing each component shown below, a coating liquid (1) for forming a liquid crystal layer was prepared by filtering using a polypropylene filter (pore diameter: 0.2 µm).

—Components—
(1) Rod-like thermotropic liquid crystal compound (compound (A) shown below): 100 parts by mass
(2) Chiral agent (compound (B) shown below, Palicolor (registered trademark) LC756, BASF): 1.7 parts by mass
(3) Photopolymerization initiator (IRGACURE (registered trademark) 907, BASF): 3 parts by mass
(4) Photopolymerization initiator (PM758, Nippon Kayaku Co., Ltd.): 1 part by mass
(5) Alignment restriction agent (compound (C) shown below): 0.5 parts by mass
(6) Solvent (methyl ethyl ketone): 184 parts by mass
(7) Solvent (cyclohexanone): 31 parts by mass The compound (A) is a mixture of the following three compounds. The content of each compound in the mixture is 84% by mass, 14% by mass, and 2% by mass in order from the top.

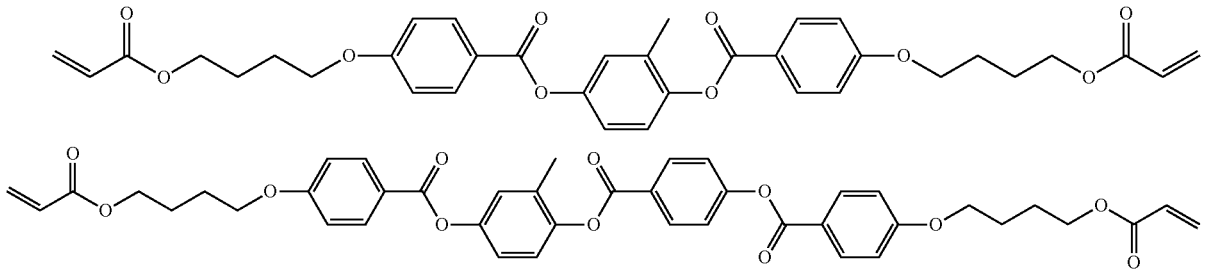

-continued

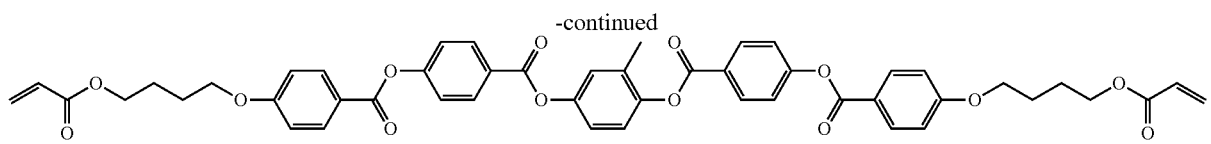

A chemical structure of the compound (B) is shown below.

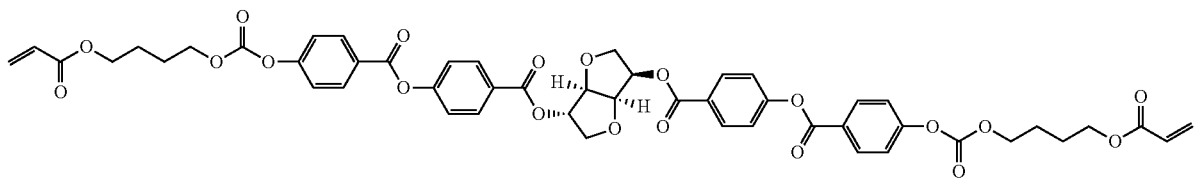 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

A chemical structure of the compound (C) is shown below.

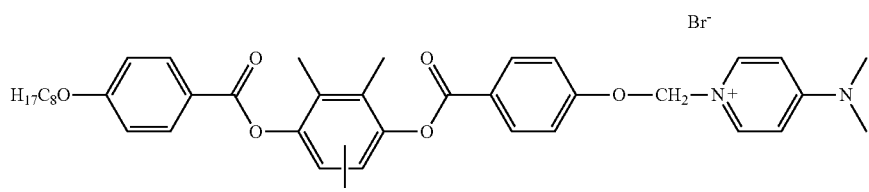

(Coating)

The substrate having the alignment layer was heated at 70° C., and then the coating liquid (1) for forming a liquid crystal layer was applied onto the alignment layer using a bar (bar number: 18).

(Drying)

The coating liquid (1) for forming a liquid crystal layer, which had been applied onto the alignment layer, was dried in an oven at 70° C. for 1 minute to form a coating film (thickness: 10 μm, content of solvent: 1% by mass or less).

(Application of Shearing Force)

With the coating film heated to 80° C., a stainless steel blade heated to 80° C. was brought into contact with the coating film, and then a shearing force was applied to the coating film by moving the blade at a speed of 3.0 m/min while keeping the stainless steel blade in contact with the coating film. A length of a contact portion of the blade with the coating film was 30 mm. A shear rate was 2,500 seconds$^{-1}$.

(Curing)

The coating film to which the shearing force was applied was irradiated with ultraviolet rays (exposure amount: 500 mJ/cm$^2$) using a metal halide lamp to cure the coating film.

[Formation of Second Cholesteric Liquid Crystal Layer]

By the following procedure, a second cholesteric liquid crystal layer (thickness: 8 μm) was formed on the first cholesteric liquid crystal layer.

(Preparation of Coating Liquid (2) for Forming Liquid Crystal Layer)

After mixing each component shown below, a coating liquid (2) for forming a liquid crystal layer was prepared by filtering using a polypropylene filter (pore diameter: 0.2 μm).

—Components—
(1) Rod-like thermotropic liquid crystal compound (compound (A)): 100 parts by mass
(2) Chiral agent (compound (B), Palicolor (registered trademark) LC756, BASF): 1.2 parts by mass
(3) Photopolymerization initiator (IRGACURE (registered trademark) 907, BASF): 1 part by mass
(4) Photopolymerization initiator (PM758, Nippon Kayaku Co., Ltd.): 1 part by mass
(5) Alignment restriction agent (compound (C)): 0.5 parts by mass
(6) Solvent (methyl ethyl ketone): 184 parts by mass
(7) Solvent (cyclohexanone): 31 parts by mass (Coating)

The substrate having the first cholesteric liquid crystal layer was heated at 70° C., and then the coating liquid (2) for forming a liquid crystal layer was applied onto the first cholesteric liquid crystal layer using a bar (bar count: 18).

(Drying)

The coating liquid (2) for forming a liquid crystal layer, which had been applied onto the first cholesteric liquid crystal layer, was dried in an oven at 70° C. for 1 minute to form a coating film (thickness: 10 μm, content of solvent: 1% by mass or less).

(Application of Shearing Force)

With the coating film heated to 70° C., a stainless steel blade heated to 70° C. was brought into contact with the coating film, and then a shearing force was applied to the coating film by moving the blade at a speed of 1.5 m/min while keeping the stainless steel blade in contact with the coating film. A length of a contact portion of the blade with the coating film was 30 mm. A shear rate was 2,500 seconds$^{-1}$.

(Curing)

The coating film to which the shearing force was applied was irradiated with ultraviolet rays (exposure amount: 500 mJ/cm$^2$) using a metal halide lamp to cure the coating film.

<Haze>

Using a haze meter (NDH 2000, Nippon Denshoku Industries Co., Ltd.), a haze of each cholesteric liquid crystal film was measured. The measurement results are shown in Table 1.

TABLE 1

|  | Connection rate of dark portions [%] | First cholesteric liquid crystal layer | | Second cholesteric liquid crystal layer | | Haze [%] |
|---|---|---|---|---|---|---|
|  |  | Distance between dark portions [nm] | Average angle of dark portions [°] | Distance between dark portions [nm] | Average angle of dark portions [°] |  |
| Example 1 | 94 | 0.6 | 44 | 0.8 | 68 | 26.3 |
| Example 2 | 78 | 0.8 | 42 | 0.8 | 43 | 29.8 |
| Comparative Example 1 | 0 | 0.6 | 44 | — | — | 63.1 |

[Cross Section Observation]

Using a polarization microscope, a cross section of the cholesteric liquid crystal film of Example 1 in a thickness direction was observed. In each cholesteric liquid crystal layer, a stripe pattern in which dark portions and bright portions were alternately arranged was observed. At an interface between the first cholesteric liquid crystal layer and the second cholesteric liquid crystal layer, the dark portions observed in the second cholesteric liquid crystal layer was connected to the dark portions observed in the first cholesteric liquid crystal layer.

Example 2

A cholesteric liquid crystal film of Example 2 was manufactured by the same procedure as in Example 1, except that the amount of the chiral agent added to the coating liquid (1) for forming a liquid crystal layer was changed to 1.2 parts by mass.

A cross section of the cholesteric liquid crystal film of Example 2 in a thickness direction was observed by the same procedure as that of Example 1. In each cholesteric liquid crystal layer, a stripe pattern in which dark portions and bright portions were alternately arranged was observed. At an interface between the first cholesteric liquid crystal layer and the second cholesteric liquid crystal layer, the dark portions observed in the second cholesteric liquid crystal layer was connected to the dark portions observed in the first cholesteric liquid crystal layer.

Comparative Example 1

A cholesteric liquid crystal film of Comparative Example 1 was manufactured by the same procedure as in Example 1, except that, in the formation of the second cholesteric liquid crystal layer, the dried coating film was cured without applying the shearing force to the coating film.

A cross section of the cholesteric liquid crystal film of Comparative Example 1 in a thickness direction was observed by the same procedure as that of Example 1. The orientation of the helical axis in the second cholesteric liquid crystal layer was disjointed, and at an interface between the first cholesteric liquid crystal layer and the second cholesteric liquid crystal layer, the dark portions observed in the second cholesteric liquid crystal layer was not connected to the dark portions observed in the first cholesteric liquid crystal layer.

Table 1 shows that the haze of Examples 1 and 2 is smaller than the haze of Comparative Example 1.

In Table 1, numerical values described in "Connection rate of dark portions", "Distance between dark portions", and "Average angle of dark portions" were measured by the methods described above, respectively. In Table 1, "-" means that the measurement was not possible.

The disclosure of JP2020-011540 filed on Jan. 28, 2020 is incorporated in the present specification by reference. All documents, patent applications, and technical standards described in the present specification are herein incorporated by reference to the same extent that each individual document, patent application, or technical standard was specifically and individually indicated to be incorporated by reference.

EXPLANATION OF REFERENCES

10: cholesteric liquid crystal film
20: first cholesteric liquid crystal layer
21: second cholesteric liquid crystal layer
30, 31: dark portion
40, 41: bright portion
Z: lamination direction

What is claimed is:
1. A cholesteric liquid crystal film comprising:
a first cholesteric liquid crystal layer having a first main surface and a stripe pattern in which dark portions and bright portions are alternately arranged; and
a second cholesteric liquid crystal layer which is disposed in contact with the first cholesteric liquid crystal layer and has a main surface and a stripe pattern in which dark portions and bright portions are alternately arranged,
wherein the first cholesteric liquid crystal layer and the second cholesteric liquid crystal layer are arranged along a lamination direction that is parallel to a thickness direction of the cholesteric liquid crystal film,
wherein, at an interface between the first cholesteric liquid crystal layer and the second cholesteric liquid crystal layer, the dark portions in the second cholesteric liquid crystal layer are connected to the dark portions in the first cholesteric liquid crystal layer, and
the dark portions in the first cholesteric liquid crystal layer are angled with respect to the main surface of the first cholesteric liquid crystal layer, and the dark portions extend in a direction A, which is a direction orthogonal to the lamination direction, toward the lamination direction; and the dark portions in the second cholesteric liquid crystal layer are angled with respect to the main surface of the second cholesteric liquid crystal layer, and the dark portions extend in the direction A toward the lamination direction.

2. The cholesteric liquid crystal film according to claim 1, wherein, in a cross-sectional view in a thickness direction, a distance between two adjacent dark portions in the dark portions observed in the second cholesteric liquid crystal layer is different from a distance between two adjacent dark portions in the dark portions observed in the first cholesteric liquid crystal layer.

3. The cholesteric liquid crystal film according to claim 1, wherein, in a cross-sectional view in a thickness direction, a distance between two adjacent dark portions in the dark portions observed in the second cholesteric liquid crystal layer is larger than a distance between two adjacent dark portions in the dark portions observed in the first cholesteric liquid crystal layer.

4. The cholesteric liquid crystal film according to claim 1, wherein, in a cross-sectional view in a thickness direction, a ratio of a distance between two adjacent dark portions in the dark portions observed in the second cholesteric liquid crystal layer to a distance between two adjacent dark portions in the dark portions observed in the first cholesteric liquid crystal layer is 1 to 2.

5. The cholesteric liquid crystal film according to claim 1, wherein, in a cross-sectional view in a thickness direction, a distance between two adjacent dark portions in the dark portions observed in the first cholesteric liquid crystal layer is 0.1 µm to 2 µm.

6. The cholesteric liquid crystal film according to claim 1, wherein, in a cross-sectional view in a thickness direction, a distance between two adjacent dark portions in the dark portions observed in the second cholesteric liquid crystal layer is 0.1 µm to 5 µm.

7. The cholesteric liquid crystal film according to claim 1, wherein, at the interface between the first cholesteric liquid crystal layer and the second cholesteric liquid crystal layer, a proportion of the dark portions observed in the second cholesteric liquid crystal layer, which is connected to the dark portions observed in the first cholesteric liquid crystal layer, is 50% to 100% with respect to the number of dark portions observed in the second cholesteric liquid crystal layer.

8. The cholesteric liquid crystal film according to claim 1, wherein, in a cross-sectional view in a thickness direction, an average angle of the dark portions observed in the first cholesteric liquid crystal layer is 20° to 90° with respect to a main surface of the first cholesteric liquid crystal layer.

9. The cholesteric liquid crystal film according to claim 1, wherein, in a cross-sectional view in a thickness direction, an average angle of the dark portions observed in the second cholesteric liquid crystal layer is 30° to 90° with respect to a main surface of the second cholesteric liquid crystal layer.

10. The cholesteric liquid crystal film according to claim 1, wherein the stripe pattern of the first cholesteric liquid crystal layer is observed at least in a cross section of the first cholesteric liquid crystal layer in a thickness direction, and the stripe pattern of the second cholesteric liquid crystal layer is observed at least in a cross section of the second cholesteric liquid crystal layer in a thickness direction.

11. The cholesteric liquid crystal film according to claim 1, wherein, at the interface between the first cholesteric liquid crystal layer and the second cholesteric liquid crystal layer, the dark portions and the bright portions are alternately arranged along the directions A.

\* \* \* \* \*